(12) United States Patent
Arabi et al.

(10) Patent No.: US 7,117,114 B2
(45) Date of Patent: Oct. 3, 2006

(54) ON-DIE TEMPERATURE CONTROL DATA FOR COMMUNICATING TO A THERMAL ACTUATOR

(75) Inventors: Tawfik Arabi, Tigard, OR (US); Hung-Piao Ma, Portland, OR (US); Benson D. Inkley, North Plains, OR (US); Gregory M. Iovino, Hillsboro, OR (US); Stephen H. Gunther, Beaverton, OR (US); Matthew C. Reilly, Seaside, OR (US)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 10/924,719

(22) Filed: Aug. 23, 2004

(65) Prior Publication Data

US 2006/0052970 A1 Mar. 9, 2006

(51) Int. Cl.
*G01K 1/08* (2006.01)
(52) U.S. Cl. .................................................. 702/132
(58) Field of Classification Search ................ 702/132
See application file for complete search history.

(56) References Cited

U.S. PATENT DOCUMENTS 6,789,037 B1 * 9/2004 Gunther et al. ............. 702/132

2003/0110423 A1 * 6/2003 Helms et al. ................ 714/100
2005/0211426 A1 * 9/2005 Ziamik et al. .............. 165/287

OTHER PUBLICATIONS

P. W. Atkins, "Thermodynamic principles", in AccessScience@McGraw-Hill, http://www.accessscience.com, DOI 10.1036/1097-8542.690700, last modified: Aug. 16, 2002.*
Program Assemblers, Henry Dietz, Purdue University, West Lafayette, IN, Wiley Encyclopedia of Electrical and Electronics Engineering Copyright © 1999 by John Wiley & Sons, Inc. All rights reserved. DOI: 10.1002/047134608X.W1677, http://www.mrw.interscience.wiley.com/eeee/articles/W1677/sect2-fs.html Article Online Posting Date: Dec. 27, 1999.*

* cited by examiner

*Primary Examiner*—Bryan Bui
*Assistant Examiner*—Tung Lau
(74) *Attorney, Agent, or Firm*—Blakely, Sokoloff, Taylor & Zafman LLP (57) ABSTRACT

An on-die temperature control variable is provided to throttle a thermal actuator for cooling an integrated circuit. The integrated circuit includes a storage element to hold the temperature control variable. A temperature sensor is thermally coupled to the integrated circuit to sense an operating temperature of the integrated circuit. A thermal controller is communicatively coupled to the storage element and to the temperature sensor. The thermal controller throttles the thermal actuator when the temperature sensor indicates that the operating temperature of the integrated circuit is below the temperature control variable.

23 Claims, 6 Drawing Sheets

ON-DIE TEMPERATURE CONTROL DATA FOR COMMUNICATING TO A THERMAL ACTUATOR

TECHNICAL FIELD

This disclosure relates generally to integrated circuits, and in particular but not exclusively, relates to fan speed control for cooling integrated circuits.

BACKGROUND INFORMATION

As processors continue to shrink in size and increase in speed, heat dissipation is evermore critical. Fans are often used to cool a processor and maintain the processor below a safe operating temperature. If a processor operates for an extended period of time at temperatures elevated beyond the recommended operating temperature, temperature induced degradation may lead to an unreliable processor. Low operating temperatures can be ensured by sacrificing operating speed, but do so at the expense of processor performance.

While an excessive high-speed fan ensures reliable operation, the acoustic noise generated by such can be bothersome and distracting to a user. If a computer system is operated in a noisy work environment, a noisy fan may not be of concern. However, placing the same computer system within a quiet home setting, a library, or the like, can be irritating and untenable. As such, acoustic noise level of a computer system has become a major influencing factor when making a purchasing decision. In fact, consumer advocate groups and government agencies have gone so far as to define acoustic specifications.

Computer manufactures have responded by developing ad hoc original equipment manufacture ("OEM") specific thermal solutions. These thermal solutions attempt to balance two diametrically opposing goals-fan speed reduction to attain a quiet system and temperature control to ensure long-term product reliability.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for communicating thermal control information from an integrated circuit ("IC") to a thermal actuator for cooling the IC are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
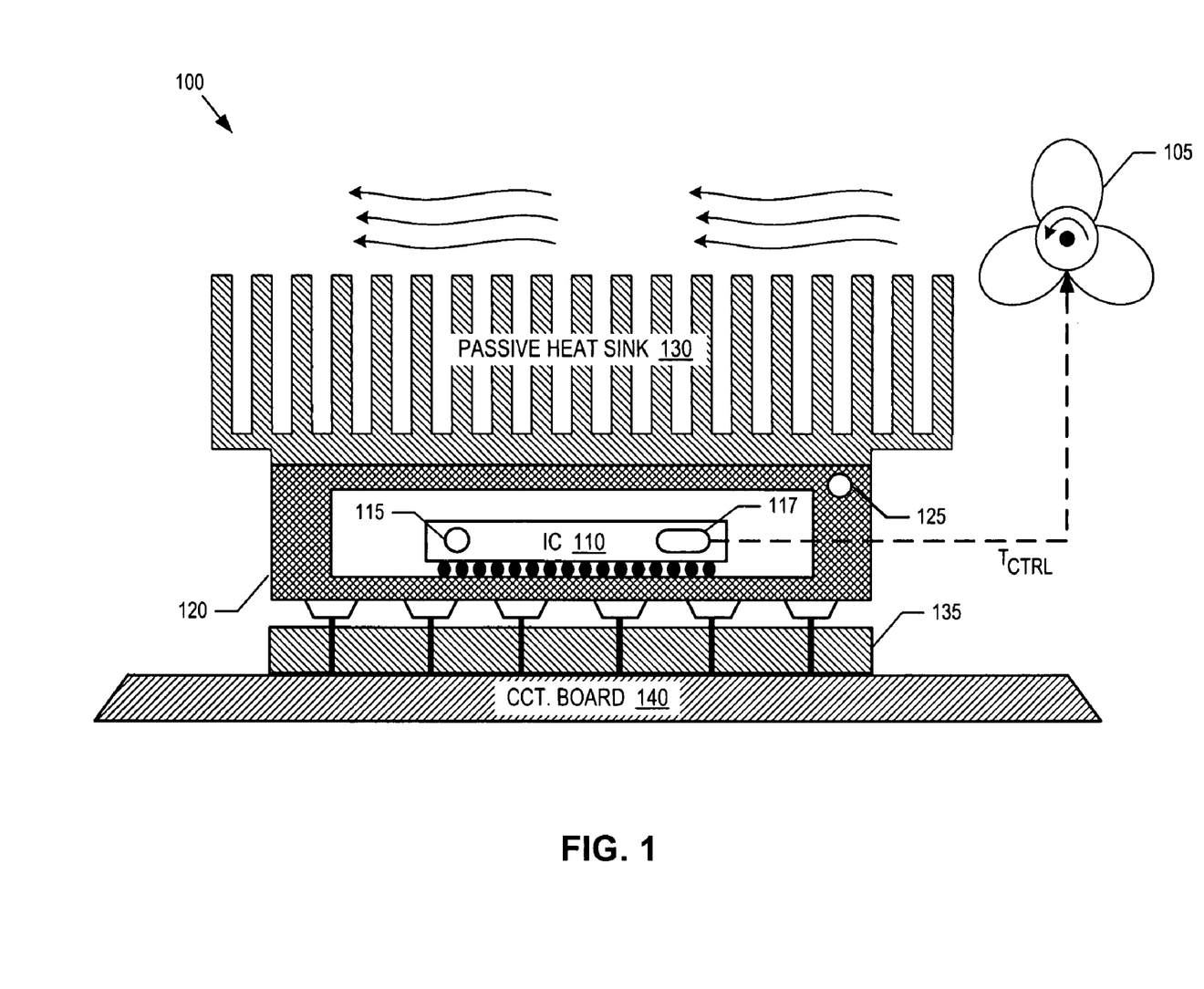
FIG. 1 is a structural diagram illustrating a thermal system having a variable thermal actuator responsive to a temperature control variable communicated from an integrated circuit, in accordance with an embodiment of the present invention.

FIG. 1 is a structural diagram illustrating a thermal system 100 having a variable thermal actuator 105 responsive to a temperature control variable $T_{CTRL}$ communicated from IC 110, in accordance with an embodiment of the present invention. The illustrated embodiment of thermal system 100 includes thermal actuator 105, IC 110 including an on-die temperature sensor 115 and a control register 117, a package 120 including a package temperature sensor 125, a passive heat sink 130, a socket 135, and a circuit board 140. Together, thermal actuator 105 and passive heat sink 130 form a heat sink 145 having a variable thermal efficiency $\Psi$.

The components of thermal system 100 are interconnected as follows. Socket 135 is mounted on top of circuit board 140 and receives connector pins extending down from package 120 to couple IC 110 to external electronic components disposed on circuit board 140. In one embodiment, IC 110 is a processor and circuit board 140 is a motherboard having a chipset and other related computer components disposed thereon communicatively coupled to the processor via socket 135.

In one embodiment, IC 110 is thermally coupled to package 120 to readily transfer heat generated in IC 110 to package 120. Passive heat sink 130 is thermally mounted to package 120 to conduct heat generated by IC 110 away from package 120. Passive heat sink 130 may be formed of any heat conducting material, such as metals, metal alloys, and the like. Passive heat sink 130 may further radiate heat generated by IC 110 to a surrounding environment to promote heat transfer away from IC 110. In one embodiment, thermal actuator 105 is a fan capable of driving air (or other suitable cooling fluid) across the surface of passive heat sink 130. Driving a cooling fluid across passive heat sink 130 provides yet another mechanism to transfer heat away from package 120 (and therefore IC 110) via convection heat transfer to the surrounding environment.

Figure 2:
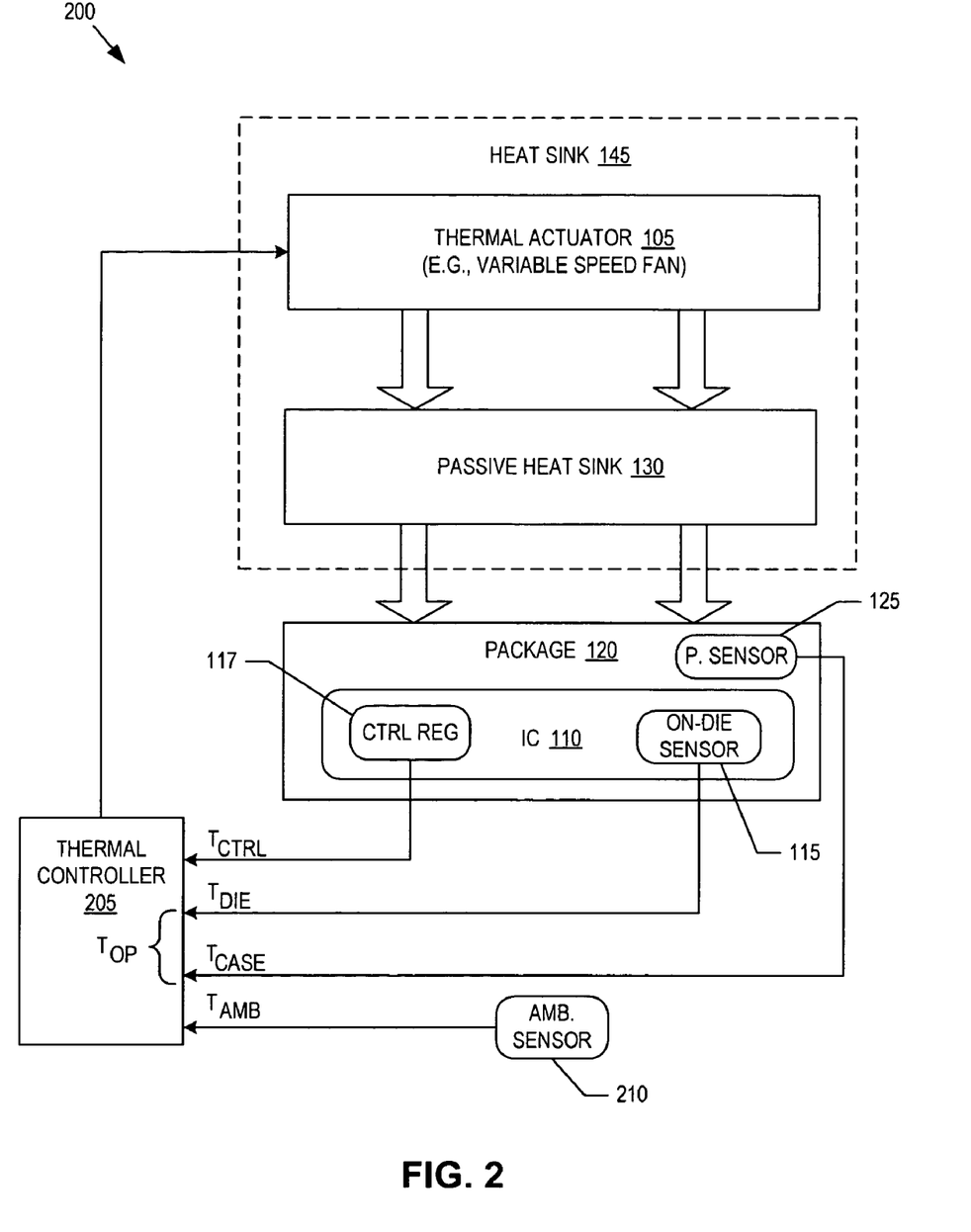
FIG. 2 is a functional block diagram illustrating components of a thermal system having a variable thermal actuator to minimize acoustic noise of a heat sink, in accordance with an embodiment of the present invention.

FIG. 2 is a functional block diagram illustrating a functional system 200, in accordance with an embodiment of the present invention. Functional system 200 depicts thermal system 100 from a functional perspective. The illustrated embodiment of functional system 200 includes IC 110, package 120, heat sink 145 including thermal actuator 105 and passive heat sink 130, and a thermal controller 205. In one embodiment, functional system 200 further includes an ambient temperature sensor 210.

IC 110 is coupled to thermal controller 205 to communicate the temperature control variable $T_{CTRL}$ stored on a die of IC 110 within control register 117. In turn, thermal controller 205 is coupled to thermal actuator 105 to control thermal actuator 105 based, at least in part, on the value of $T_{CTRL}$. In one embodiment, thermal controller 205 is communicatively coupled to control register 117 via a hardwire/conductor trace to one of the connector pins coupling package 120 to circuit board 140 through socket 135 (see FIG. 1). In one embodiment, thermal controller 205 is communicatively coupled to control register 117 via software access along a system bus (not illustrated). Although control register 117 is labeled as a "register", control register 117 should be interpreted to include any number of on-die storage elements capable of storing data, such as nonvolatile memory, fusible memory devices, and the like.

Thermal controller 205 is further communicatively coupled to one or both of on-die temperature sensor 115 and package temperature sensor 125. Based on one or both of temperature sensors 115 and 125, thermal controller 205 can determine an operating temperature $T_{OP}$ of IC 110. Package sensor 125 determines a case temperature $T_{CASE}$, which is approximately related to the operating temperature $T_{OP}$. In one embodiment, thermal controller 205 approximates $T_{OP}$ based on $T_{CASE}$. However, approximating $T_{OP}$ based on $T_{CASE}$ is inherently inaccurate due to a number of variable factors. For example, the $T_{CASE}$ to $T_{OP}$ approximation is dependent upon package tolerances, the physical configuration of passive heat sink 130 and thermal actuator 105, intra-package thermal conductivity, thermal interfaces, material variances, and variable power dissipation.

Accordingly, a more accurate temperature reading of IC 110 may be obtained from on-die temperature sensor 115. On-die temperature sensor 115 generates a die temperature $T_{DIE}$, which is a more accurate reading of the operating temperature $T_{OP}$. On-die temperature sensor 115 may be disposed anywhere within IC 110 to measure the temperature thereof. In one embodiment, on-die temperature sensor 115 is positioned adjacent/proximate to the highest operating temperature subcomponent of IC 110. For example, in an embodiment where IC 110 is a processor, on-die temperature sensor 115 may be positioned next to a floating-point math unit ("FPMU"), an arithmetic logic unit ("ALU"), or other power intensive subcomponent. On-die temperature sensor 115 and package temperature sensor 125 may be formed of various devices, such as temperature diodes, digital thermometers, thermocouples, and the like. In a temperature diode embodiment for on-die temperature sensor 115, the diode may be located on-die while external circuitry for driving current through the diode and/or sensing a voltage drop across the diode may be located off die within thermal controller 205 or elsewhere.

In one embodiment, thermal controller 205 is coupled to ambient temperature sensor 210 to determine an ambient temperature $T_{AMB}$ of the environment surrounding package 120. In other embodiments, thermal controller 205 may assume an ambient temperature (e.g., 38° C.).

Based on some or all of the input values of $T_{CTRL}$, $T_{CASE}$, $T_{DIE}$, and $T_{AMB}$, thermal controller 205 controls thermal actuator 105 to provide variable cooling of passive heat sink 130, thereby maintaining IC 110 at a safe operating temperature, while reducing the acoustical noise generated by thermal actuator 105 (e.g., a fan). Depending upon the particular task being executed by IC 110, the power dissipated within IC 110 can greatly vary. The heat generated by IC 110 is directly related to the power dissipation. Thermal efficiency $\Psi$ of heat sink 145 is a measure of the cooling ability of heat sink 145. In an embodiment where thermal actuator 105 is a fan, $\Psi$ is related to fan revolutions per minute ("RPM") according to equation 1, $$\Psi = X \cdot \text{fanRPM} \quad \text{(Equation 1)}$$

where X is a scaling constant. The operating temperature $T_{OP}$ of IC 110 is related to the power dissipation P within IC 110 according the equation 2, $$T_{OP} = T_{AMB} + P \cdot \Psi \quad \text{(Equation 2)}$$

Accordingly, the operating temperature $T_{OP}$ of IC 110 is related to the fan RPM, the ambient temperature $T_{AMB}$, and the power dissipation P.

One cooling solution, is to set thermal actuator 105 to a maximal setting (e.g., maximum fan RPM) such that heat sink 145 is always providing maximal cooling, regardless of the power dissipation within IC 110. This solution can guarantee long-term reliability of IC 110 by preventing prolonged elevated operating temperatures, but does so at the expense of silent operation. Since thermal actuator 105 is always set to high speed, it generates maximal acoustical noise at all times, even when IC 110 is idle.

Another solution is for thermal controller 205 to throttle thermal actuator 105 when the operating temperature $T_{OP}$ of IC 110 drops below a predefined safe threshold. This throttling threshold may be communicated to thermal controller 205 by IC 110 as the temperature control variable $T_{CTRL}$. $T_{CTRL}$ is a temperature value indicating the safe operating temperature threshold of IC 110, below which thermal controller 205 is free to throttle thermal actuator 105 or even turn off thermal actuator 105. For operating temperatures above $T_{CTRL}$, thermal controller 205 should instruct heat sink 145 to provide a predetermined thermal efficiency $\Psi$, according to an original equipment manufacture ("OEM") specified thermal solution design. In one embodiment, this thermal solution design may provide that the fan RPM should be set to a maximum speed when the operating temperature $T_{OP}$ is above the control temperature $T_{CTRL}$. In one embodiment, the thermal solution design may specify the fan RPM based on the sensed ambient temperature $T_{AMB}$.

Figure 3:
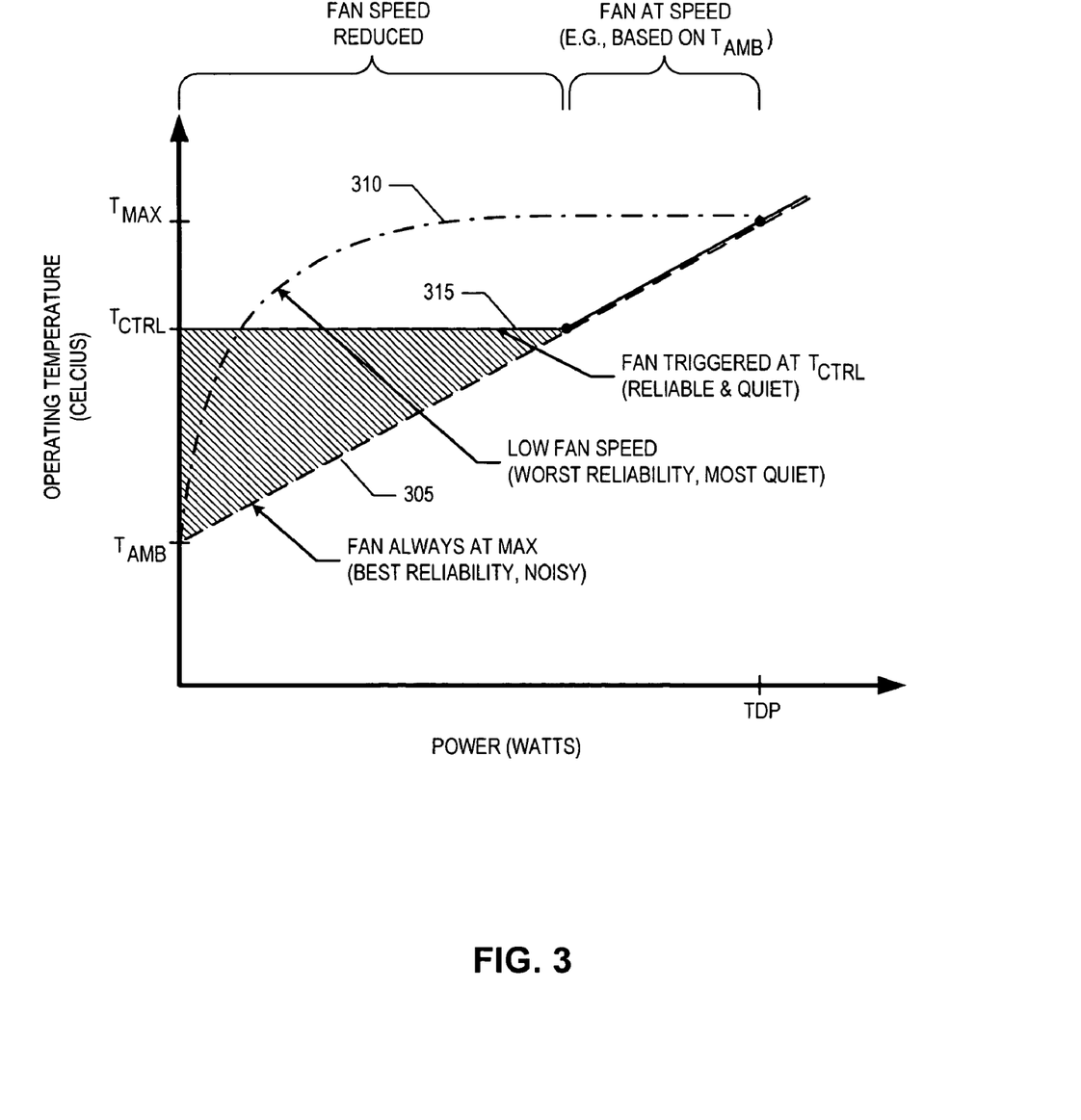
FIG. 3 is a line graph illustrating how a thermal actuator can be throttled when a processor temperature is below a uniquely determined control temperature, in accordance with an embodiment of the present invention.

FIG. 3 is a line graph illustrating multiple thermal profiles 305, 310, and 315 for IC 110. Thermal profiles define how the case temperature $T_{CASE}$ changes as power dissipation within IC 110 changes for a given thermal solution design.

Thermal profile 305 illustrates an "always on" profile where thermal actuator 105 is set to a maximum level at all times. For any given power dissipation level, thermal profile 305 maintains IC 110 at the minimal operating temperature $T_{OP}$. While thermal profile 305 provides safe, reliable operation of IC 110, it does so at the expense of silent operation. Since thermal actuator 105 is always set on high (e.g., maximum fan RPM), heat sink 145 generates maximal acoustic noise, even when IC 110 is idle.

Thermal profile 310 illustrates an over heated profile. Depending upon power dissipation by IC 110, thermal profile 310 operates IC 310 close to the maximum operating temperature $T_{MAX}$ on a near constant basis, except when power dissipation is very low. As such, IC 110 runs hot almost all the time during ordinary use, except when idle. While operating IC 110 at or near $T_{MAX}$ may not cause short-term failure, extended operating durations at $T_{MAX}$ can severely shorten the reliable operating lifetime of IC 110 due to high temperature related aging effects (e.g., hot carrier degradation, negative bias temperature instability, and the like).

Thermal profile 315 illustrates how thermal controller 205 can throttle thermal actuator 105 when the operating temperature $T_{OP}$ of IC 110 is below the control temperature $T_{CTRL}$, in accordance with an embodiment of the present invention. The shading between thermal profile 315 and 305 illustrates that thermal controller 205 can instruct thermal actuator 105 to apply as little or as much cooling as desired to attain acoustic noise goals, as long as the operating temperature $T_{OP}$ is below $T_{CTRL}$. If the operating temperature $T_{OP}$ is above $T_{CTRL}$, then thermal controller 205 should instruct thermal actuator 105 to increase its thermal efficiency (i.e., increase fan speed) to match that specified by the thermal solution design.

A thermal solution design specifies that for any given power dissipation by IC 110, heat sink 145 must maintain IC 110 at or below a specified temperature. In general, a thermal solution design is based on the highest power dissipation levels attainable by IC 110. This highest power dissipation level is called the Thermal Design Point ("TDP"). In other words, a fan speed of thermal actuator 105 should be available to heat sink 145 capable of maintaining IC 110 below $T_{MAX}$ when power dissipation is equal to the TDP. The temperature control variable provided to thermal controller 205 from control register 117 indicates to thermal controller 205 that if the operating temperature $T_{OP}$ is below a safe operating temperature threshold specified as $T_{CTRL}$, then it is safe to reduce the thermal efficiency $\Psi$ of heat sink 145 by throttling thermal actuator 105.

However, fabrication inconsistencies can greatly affect the safe operating temperature threshold of IC 110 and therefore $T_{CTRL}$ can substantially vary on a part-by-part basis of a single design. Accordingly, in one embodiment, $T_{CTRL}$ is a uniquely determined value on a part-by-part basis. For example, $T_{CTRL}$ may be a factory calibrated control variable that is fused into each instance of IC 110 at the factory.

The processes explained below are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like. The order in which some or all of the process blocks appear in each process should not be deemed limiting. Rather, one of ordinary skill in the art having the benefit of the present disclosure will understand that some of the process blocks may be executed in a variety of orders not illustrated.

Figure 4:
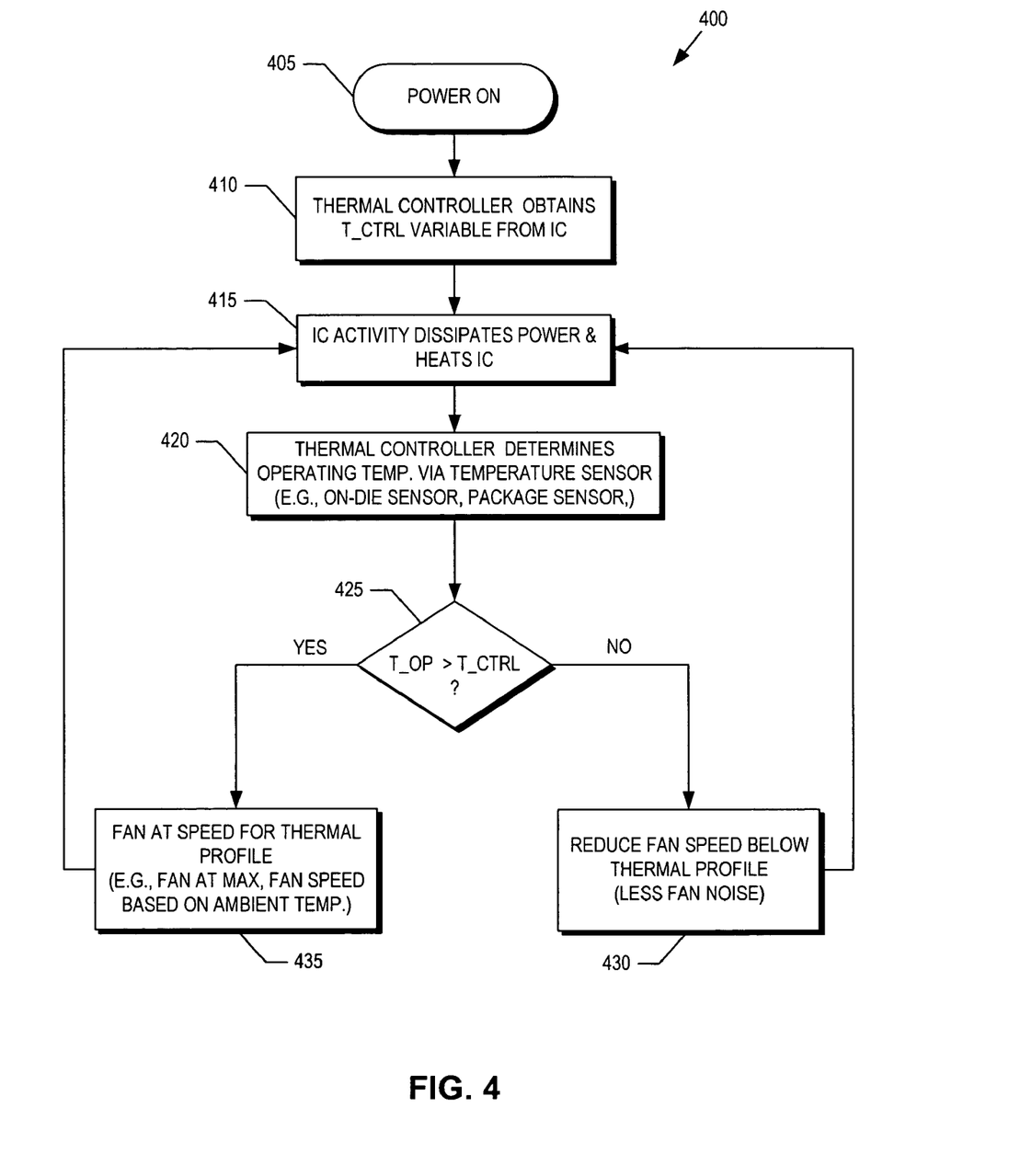
FIG. 4 is a flow chart illustrating a process for controlling a thermal actuator to reduce acoustic noise of a heat sink, in accordance with an embodiment of the present invention.

FIG. 4 is a flow chart illustrating a process 400 for controlling thermal actuator 105 to reduce acoustic noise generated by heat sink 145, in accordance with an embodiment of the present invention.

In a process block 405, IC 110 is powered on. In a process block 410, thermal controller 205 obtains the temperature control variable $T_{CTRL}$ from IC 110. As discussed above, thermal controller 205 may be hardwired to control register 117 to gain access thereto or IC 110 may communicate the temperature control variable $T_{CTRL}$ to thermal controller 205 via software (e.g., BIOS routine executed early in a pre-boot phase of IC 110).

In a process block 415, IC 110 begins execution after power is applied. Once IC 110 begins activity, it will begin to consume power and generate heat. In a process block 420, thermal controller 205 monitors the operating temperature of IC 110 via one or both of on-die temperature sensor 115 and package temperature sensor 125.

In a decision block 425, if the operating temperature $T_{OP}$ is determined to be less than the control temperature $T_{CTRL}$ communicated to thermal controller 205, then process 400 continues to a process block 430. In process block 430, thermal controller 205 throttles thermal actuator 105. In the embodiment where thermal actuator 105 is a mechanical fan, thermal controller 205 decreases the fan RPM speed below that indicated by the thermal solution design. Throttling thermal actuator 105 reduces the thermal efficiency T of heat sink 145 and reduces the acoustic noise generated by thermal actuator 105. As long as the operating temperature $T_{OP}$ of IC 110 remains under $T_{CTRL}$, thermal actuator 105 can remain throttled-even to an off setting.

Returning to decision block 425, if the operating temperature $T_{OP}$ rises above $T_{CTRL}$, then process 400 continues to a process block 435. In process block 435, thermal actuator 105 is no longer throttled, but rather increased. In the embodiment of a fan, the fan RPM is increased to meet the thermal efficiency T requirements defined by the particular thermal solution design. In one embodiment, increasing the fan RPM may simply including increasing the fan RPM to a maximum design speed. In one embodiment, the fan RPM may be increased to a speed dependent upon the ambient temperature $T_{AMB}$ measured by ambient temperature sensor 210. The fan speed may be increased until the maximum design speed of the fan is attained or the operating temperature $T_{OP}$ of IC 110 is reduced below $T_{CTRL}$.

Figure 5:
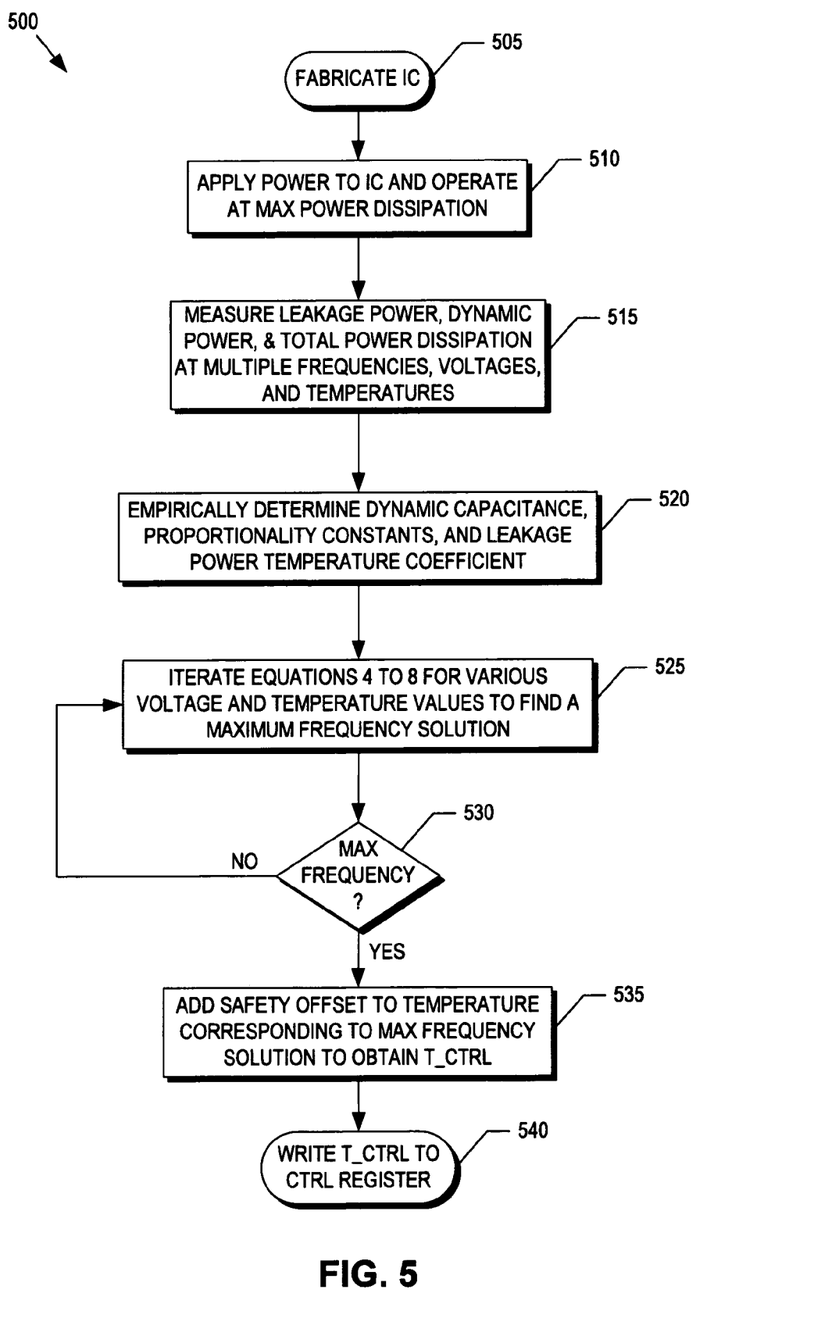
FIG. 5 is a flow chart illustrating a process for calibrating an integrated circuit with a unique temperature control variable on a part-by-part basis, in accordance with an embodiment of the present invention.

FIG. 5 is a flow chart illustrating a process 500 for generating a unique temperature control variable $T_{CTRL}$ on a part-by-part basis of IC 110, in accordance with an embodiment of the present invention. Once IC 110 has been fabricated (process block 505), operational tests are conducted on IC 110 to calibrate IC 110 with a unique temperature control variable $T_{CTRL}$. In a process block 510, IC 110 is powered up and stimulated to operate at a maximum power dissipation.

While operating at the maximum power dissipation, leakage power, dynamic power, and total power dissipation at multiple frequencies, voltages, and temperatures are measured. Leakage power results from leakage current flowing through non-switching transistors. Dynamic power results from dynamic current flowing through switching transistors. Leakage current varies substantially from one part to the next due to fabrication inconsistencies. Leakage current is determined mainly by voltage, temperature, and the process technology, but is generally unrelated to clock frequency. In contrast, dynamic current is fairly constant from one part to the next. When IC 110 executes software instructions, various parts of IC 110 are stimulated causing internal transistors to switch and conduct current. A major influencing factor determining dynamic current is clock frequency. Total current is the sum total of the leakage current and the dynamic current. Similarly, total power is equal to the sum total of the leakage power and the dynamic power. Equation 3 illustrates that the total power dissipation within IC 110 when powered up and stimulated is a function of dynamic capacitance, voltage, temperature, and frequency.

$$P_{total} = \text{func}(c, V, T, f) \quad \text{(Equation 3)}$$

$P_{total}$ represents total power dissipation, c represents dynamic capacitance, f represents clock frequency, V represents supply voltage, and T represents temperature. Equation 3 is a generic equation describing total power dissipation. The specific function may change from one design/process to the next, but may be generated based on simulations or empirically determined from testing. For example, the function of equation 3 may be a polynomial approximation including several terms having proportionality constants.

In a process block 520, dynamic capacitance c and the proportionality constants are empirically determined from the measurements taken in process block 515 by plugging the measurements at the multiple frequencies, temperatures, and voltages into Equation 3. Once c and the proportionality constants are empirically determined, these values are inserted into Equations 4–8 below, and mathematically iterated upon at various voltage V and temperature T combinations to determine a maximum frequency f solution for Equations 4–8 (process block 525). Equations 4–8 relate voltage and temperature as follows:

$$V_j = V_R - I_t Z \qquad \text{(Equation 4)}$$

$$T_{OP} = T_{AMB} + I_t V_j \times \Psi \qquad \text{(Equation 5)}$$

$$\Delta V = \alpha \Delta T \qquad \text{(Equation 6)}$$

$$V = \alpha T \qquad \text{(Equation 7)}$$

$$f = \text{func}(V, T) \qquad \text{(Equation 8)}$$

Equation 4 is a power supply AC impedance equation, commonly described as the load line equation. $V_j$ represents the supply voltage at a die of IC 110, $V_R$ represents the supply voltage output from a voltage regulator, and Z represents power supply AC impedance, which is a function of the resistive loss and decoupling network from the voltage regulator to the die of IC 110. Equation 5 is a thermal impedance equation (similar to Equation 2). $I_t$ represents the total input current to IC 110 and $I_t V_j = P_{total}$. In addition to equations 4 and 5, the temperature and voltage at the die of IC 110 should satisfy reliability constraints. These reliability constraints are usually simplified to the liner relationships between V and T described in equations 6 and 7, where "a" is a constant. Finally, equation 8 illustrates how clock frequency f is dependent upon voltage V and temperature T. Equation 8 is a generic equation, the specific function of which may vary from product to product and process to process.

Returning to FIG. 5, in a decision block 530, once the maximum frequency solution has been determined, process 500 continues to a process block 535. In process block 535, a safety offset may be added to the temperature T corresponding to the maximum frequency solution of Equations 4–8, to obtain $T_{CTRL}$. It should be appreciated that if temperature T is measured at the highest operating portion of IC 110, then a safety offset need not by added to the measured temperature T to obtain $T_{CTRL}$. For example, if on-die sensor 115 is positioned adjacent to an FPMU, then the direct measurement reading from on-die sensor 115 could be used as $T_{CTRL}$.

Finally, in a process block 540 the determined value of the temperature control variable $T_{CTRL}$ is written into control register 117. Writing $T_{CTRL}$ into control register 117 may include fusing internal circuitry of IC 110 at the factory to provide a factory calibrated temperature control variable unique to each fabricated instance of IC 110.

Figure 6:
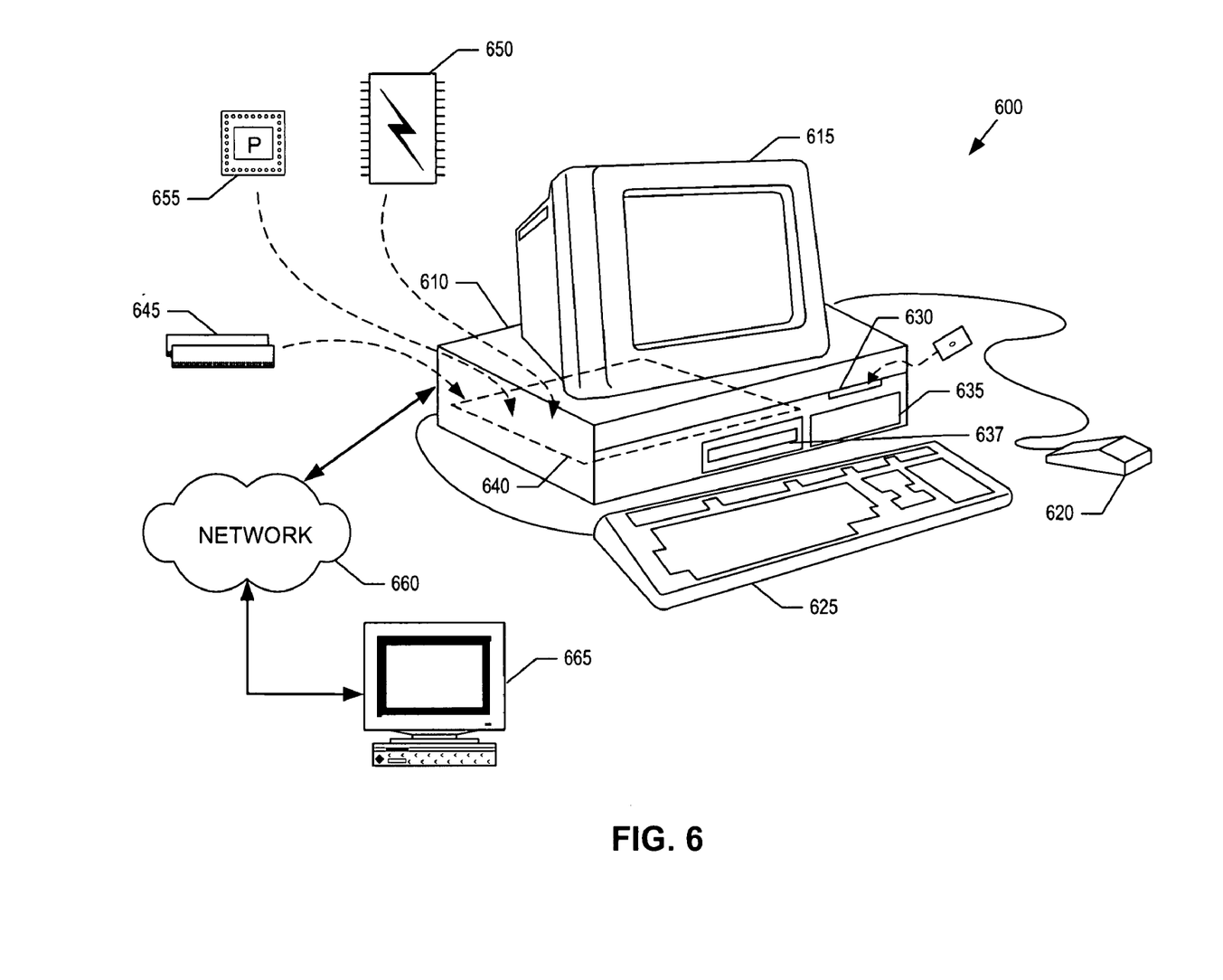
FIG. 6 illustrates a demonstrative system implementing embodiments of the present invention.

FIG. 6 is a diagram of a system 600 that implements embodiments of the present invention. The illustrated embodiment of system 600 includes a chassis 610, a monitor 615, a mouse 620 (or other pointing device), and a keyboard 625. The illustrated embodiment of chassis 610 further includes a floppy disk drive 630, a hard disk 635, a compact disc ("CD") and/or digital video disc ("DVD") drive 637, a power supply (not shown), and a motherboard 640 (e.g., circuit board 140) populated with appropriate integrated circuits including system memory 645, nonvolatile ("NV") memory 650, and one or more processor(s) 655 (e.g. IC 110).

Processor(s) 655 is communicatively coupled to system memory 645, NV memory 650, hard disk 635, floppy disk drive 630, and CD/DVD drive 637 via a chipset on motherboard 640 to send and to receive instructions or data thereto/therefrom. In one embodiment, NV memory 650 is a flash memory device. In other embodiments, NV memory 650 includes any one of read only memory ("ROM"), programmable ROM, erasable programmable ROM, electrically erasable programmable ROM, or the like. In one embodiment, system memory 645 includes random access memory ("RAM"), such as dynamic RAM ("DRAM"), synchronous DRAM, ("SDRAM"), double data rate SDRAM ("DDR SDRAM") static RAM ("SRAM"), and the like. Hard disk 635 represents any storage device for software data, applications, and/or operating systems, but will most typically be a nonvolatile storage device. Hard disk 635 may optionally include one or more of an integrated drive electronic ("IDE") hard disk, an enhanced IDE ("EIDE") hard disk, a redundant array of independent disks ("RAID"), a small computer system interface ("SCSI") hard disk, and the like.

In one embodiment, a network interface card ("NIC") (not shown) is coupled to an expansion slot (not shown) of motherboard 640. The NIC is for connecting system 600 to a network 660, such as a local area network, wide area network, or the Internet. In one embodiment network 660 is further coupled to a remote computer 665, such that system 600 and remote computer 665 can communicate. System 600 may transmit software logs 150 over network 560 to a central repository located on remote computer 665.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   obtaining a temperature control variable from a processor, the temperature control variable being stored within a non-volatile memory device within the processor;
   sensing an operating temperature of the processor;
   coupling the temperature control variable and the operating temperature into a thermal controller externally coupled to the processor; and
   throttling a thermal actuator of a heat sink thermally coupled to the processor under control of the externally coupled thermal controller, if the sensed operating temperature is below a temperature value indicated by the temperature control variable obtained from the processor.

2. The method of claim 1, wherein the temperature control variable is unique to the processor.

3. The method of claim 2, wherein the temperature control variable comprises a factory calibrated control variable stored on a die of the processor.

4. The method of claim 3, wherein obtaining the control variable from the processor comprises accessing a software visible control register.

5. The method of claim 3, wherein the temperature value indicated by the temperature control variable is less than a maximum operating temperature for the processor.

6. The method of claim 1, wherein sensing the operating temperature of the processor comprises sensing the operating temperature of the processor with an on-die temperature sensor.

7. The method of claim 1, wherein throttling the thermal actuator of the heat sink thermally coupled to the processor comprises decreasing a speed of a fan cooling a passive heat sink thermally coupled to the processor.

8. The method of claim 7, further comprising increasing the speed of the fan if the sensed operating temperature is above the temperature value indicated by the temperature control variable until the sensed operating temperature is lowered below the temperature control variable or a maximum design speed of the fan is reached.

9. The method of claim 7, further comprising:
sensing an ambient temperature; and
adjusting the speed of the fan based in part on the sensed ambient temperature.

10. The method of claim 1, wherein obtaining the temperature control variable from the processor comprises communicating a desired operating temperature of the processor from the processor to a thermal controller throttling the thermal actuator.

11. An apparatus, comprising:
an integrated circuit including a non-volatile storage element storing a temperature control variable;
a temperature sensor thermally coupled to the integrated circuit to sense an operating temperature of the integrated circuit; and
a thermal controller communicatively coupled to the storage element and to the temperature sensor, the thermal controller external to the integrated circuit, the thermal controller configured to throttle a thermal actuator to cool the integrated circuit when the temperature sensor indicates that the operating temperature of the integrated circuit is below a temperature value indicated by the temperature control variable.

12. The apparatus of claim 11, wherein the temperature control variable comprises a factory calibrated control variable unique to the integrated circuit.

13. The apparatus of claim 12, wherein the storage element comprises a fusible storage element fused with the temperature control variable.

14. The apparatus of claim 11, wherein the temperature sensor comprises an on-die temperature sensor.

15. The apparatus of circuit of claim 11, further comprising:
a passive heat sink thermally coupled to the integrated circuit; and
a fan positioned to cool the passive heat sink, wherein the thermal actuator comprises the fan and wherein the thermal controller is coupled to decrease a speed of the fan when the temperature sensor indicates that the operating temperature of the integrated circuit is below the temperature control variable.

16. The apparatus of claim 15, further comprising an ambient temperature sensor to sense an ambient temperature coupled to the thermal controller, the thermal controller coupled to adjust the speed of the fan based in part on the ambient temperature sensed by the ambient temperature sensor.

17. The apparatus of claim 15 wherein the thermal controller is coupled to increase the speed of the fan when the operating temperature of the integrated circuit is above the temperature value indicated by the temperature control variable unless a maximum design speed is reached.

18. The apparatus of claim 11, wherein the integrated circuit comprises a processor.

19. A method, comprising:
operating an integrated circuit at multiple operating temperatures;
measuring power dissipation by the integrated circuit at the multiple operating temperatures;
determining a temperature control variable based at least in part on the measured power dissipation at the multiple operating temperatures, wherein the temperature control variable indicates an operating temperature of the integrated circuit below which a thermal actuator cooling the integrated circuit may be throttled; and
storing the temperature control variable to a non-volatile storage element within the integrated circuit.

20. The method of claim 19, wherein determining the temperature control variable comprises:
empirically determining a dynamic capacitance based at least in part on the measuring the power dissipation; and
iterating voltage/temperature equations mathematically describing operating of the integrated circuit to obtain a maximum frequency solution to the voltage/temperature equations.

21. The method of claim 20, wherein determining the temperature control variable further comprises adding a safety offset to a operating temperature of the integrated circuit corresponding to the maximum frequency solution.

22. The method of claim 19, wherein storing the temperature control variable to the integrated circuit comprises fusing a storage element within the integrated circuit.

23. The method of claim 19, wherein the integrated circuit comprises a processor.

* * * * *